(12) United States Patent
Kotten et al.

(10) Patent No.: US 6,980,289 B2
(45) Date of Patent: Dec. 27, 2005

(54) SYSTEM AND METHOD FOR MEASURING AND COMPENSATING FOR THE POLARIZATION MODE DISPERSION OF AN OPTICAL SIGNAL

(75) Inventors: Klaus Kotten, Munich (DE); Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/085,789

(22) Filed: Mar. 21, 2005

(65) Prior Publication Data

US 2005/0168725 A1  Aug. 4, 2005

Related U.S. Application Data

(62) Division of application No. 10/334,587, filed on Dec. 30, 2002.

(30) Foreign Application Priority Data

Dec. 28, 2001 (DE) ............................... 101 64 497

(51) Int. Cl.⁷ .......................................... G01N 21/00
(52) U.S. Cl. .................................................. 356/73.1
(58) Field of Search ... 356/73.1, 364–370; 398/39–99; 250/214 R, 225, 340, 341.1–341.8

(56) References Cited

U.S. PATENT DOCUMENTS

| | | | | |
|---|---|---|---|---|
| 4,675,839 A | * | 6/1987 | Kerr | 708/815 |
| 6,385,187 B1 | * | 5/2002 | Ahn et al. | 370/342 |
| 6,463,049 B1 | * | 10/2002 | Abe et al. | 370/347 |

FOREIGN PATENT DOCUMENTS

| | | |
|---|---|---|
| DE | 198 18 699 A1 | 10/1999 |
| EP | 0 798 993 A2 | 1/1997 |
| WO | WO 00/03505 | 1/2000 |
| WO | WO 00/41344 | 7/2000 |
| WO | WO 00/45531 | 8/2000 |

OTHER PUBLICATIONS

Impact of polarisation mode dispersion on 10 Gbit/s terrestrial systems over non-dispersion-shafted fibre, Jul. 24, 1995, Electronic Letter Online No. 1995081.
Polarization Mode Dispersion Compensation written by Phase Diversity Detection, IEEE Photonics Technology Letters, vol. 9, No. 1, Jan. 1997.

* cited by examiner

*Primary Examiner*—Tu T. Nguyen
(74) *Attorney, Agent, or Firm*—Bell, Boyd & Lloyd LLC

(57) ABSTRACT

A system and method for measuring and compensating for the polarization mode dispersion of first and higher orders for a transmitted optical signal are described wherein the propagation time difference, caused from polarization mode dispersion, between orthogonally polarized signals of the transmitted optical signal can be determined very precisely, and can be compensated for, even above a delay of a bit duration of the data signal.

8 Claims, 4 Drawing Sheets

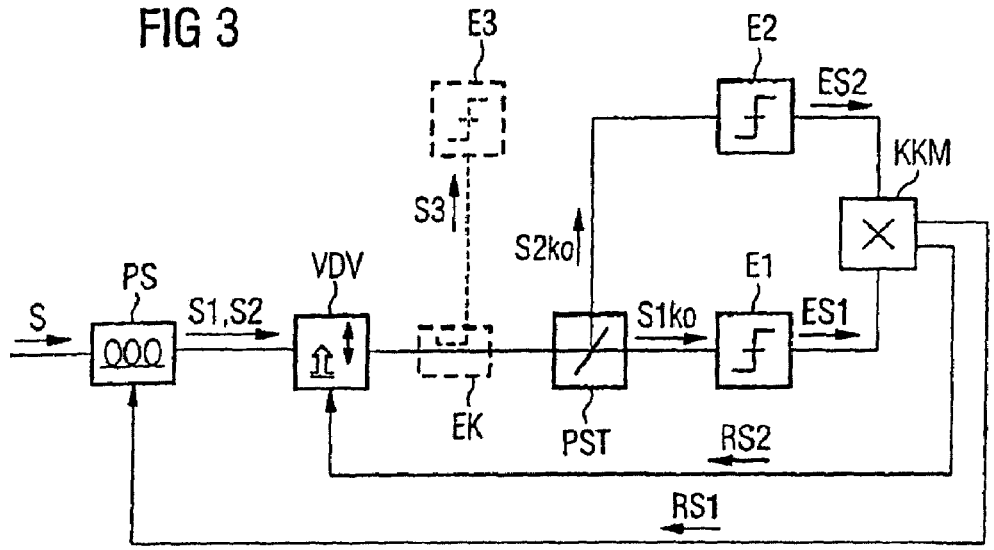
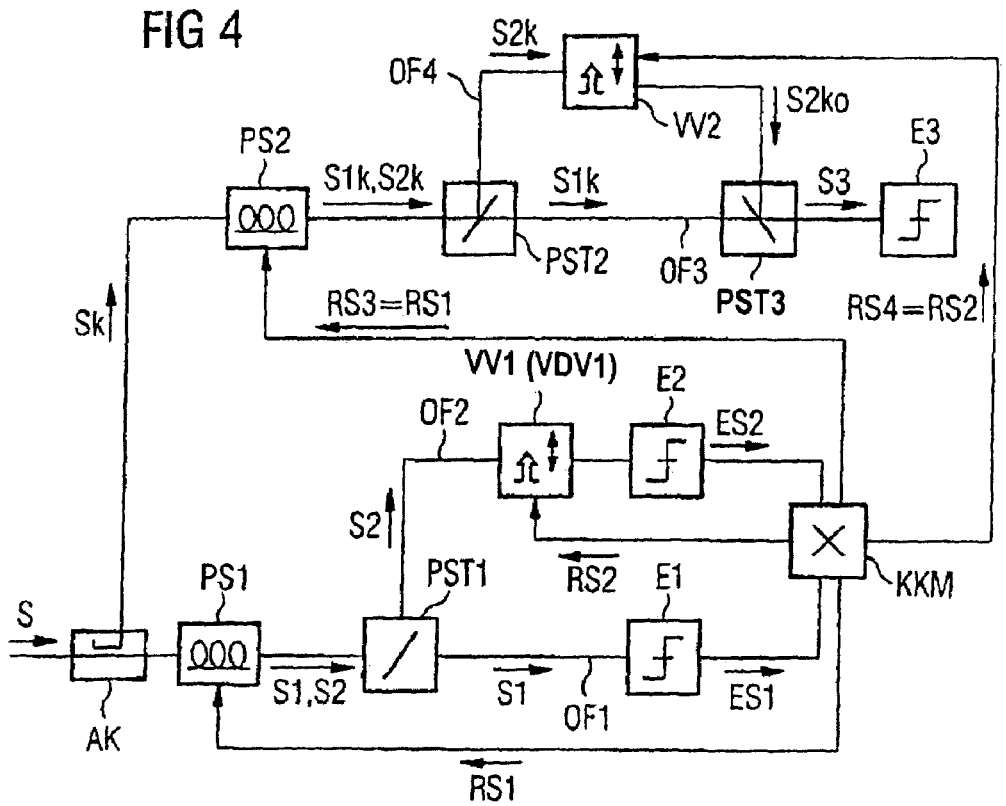

SYSTEM AND METHOD FOR MEASURING AND COMPENSATING FOR THE POLARIZATION MODE DISPERSION OF AN OPTICAL SIGNAL

This application is a divisional of and claims the benefit of U.S. patent application Ser. No. 10/334,587, filed Dec. 30, 2002, the entire contents of which are incorporated herein.

BACKGROUND OF THE INVENTION

In optical waveguides, birefringence or non-rotationally symmetrical refractive index profiles can result in different group delay times for the two orthogonal polarizations of a fundamental mode. The resultant polarization mode dispersion PMD can lead to noticeable signal distortions, especially in transmission systems with high data rates (typically from 10 Gbit/s). Small propagation time differences between the signals transmitted in both polarizations cause instances of pulse widening, and propagation time differences of the order of magnitude of the bit duration or more have an effect as intersymbol interference. In order still to be able to transmit good-quality signals with a high channel data rate in fibers with high polarization mode dispersion PMD, the propagation time differences must be compensated for again at the end of the transmission path. "Impact of Polarization Mode Dispersion on 10 Gbit/s Terrestrial Systems Over Non-Dispersion-Shifted Fiber", B. Clesca et al., Electronic Letters, 31st Aug. 1995, Vol. 31, No. 18, pages 1594–1595, illustrates the influence of polarization mode dispersion PMD on signal quality by measurement of the bit error rate BER in the case of propagation time differences between signals with a transmission rate of 10 Gbit/s.

Temperature changes in the surroundings of the optical waveguide or mechanical oscillations or inhomogeneities influence the birefringence or the symmetry of the refractive index profile and also the polarization transformations in the waveguide. As a consequence, there may be a change in the propagation time differences, and/or in the polarizations in which the two signals arrive at a receiver. A compensation method for compensating for the propagation time differences must therefore continuously measure the change and adapt an actuator in a regulating loop to the present state of polarization.

Various methods or systems for measuring or compensating for the polarization mode dispersion PMD are already known.

E 198 18 699 A1 discloses an arrangement for reducing polarization-mode-dispersion-dictated signal distortions by using a filter method. The light is passed to a photodiode for optoelectronic conversion. The electrical signal is split and fed to different electrical filters. These may be, e.g., bandpass filters with center frequencies at ½, ¼ and ⅛ of the clock frequency (that is to say 5 GHz, 2.5 GHz and 1.25 GHz in the case of 10 Gbit/s). The output voltages or output powers of the bandpass filters are detected. The quality of the data signal can be assessed from the magnitude of the spectral components thus detected. If a propagation time difference of 100 ps occurs in the case of a 10 Gbit/s NRZ (non return to zero) signal between the two principal states of polarization PSP, which corresponds to a shift by approximately 1 bit, then the output signal of the 5 GHz filter is at a minimum. In the case of a propagation time difference of 0 ps, the output signal is at a maximum. Thus, in the course of a regulation in a PMD compensator, an attempt is made via corresponding settings at the PMD compensator to maximize the signal. Since the output signal of the filter rises again in the case of propagation time differences which are greater than a bit duration, unambiguous regulation is no longer possible in this region. Therefore, the abovementioned filters with lower center frequencies are additionally required. These reach their minimum only in the case of correspondingly larger propagation time differences. Consequently, in a PMD compensator, the polarization mode dispersion PMD is firstly subjected to course compensation with the aid of the low-frequency filters and then, if the output signal of the highest-frequency filter becomes unambiguous, the greater sensitivity thereof would be utilized in order to compensate for the polarization mode dispersion PMD to the greatest possible extent and thus to readjust it as early as possible in the case of alterations. What is disadvantageous is that first identifiable distortions of the optical signal must occur before the occurrence of polarization mode dispersion PMD is detected. Moreover, distortions are primarily detected, and these may also have arisen due to effects other than PMD.

A known method for measuring the polarization mode dispersion PMD is based on an arrival time detection. In this method, in the case of an optical NRZ signal, the latter is passed through a polarization scrambler at the start of the transmission path. What is thereby achieved is that the polarization passes through all conceivable states at the start of the path within a short time interval. The signal passes through the transmission fiber and a subsequent PMD compensator. If the combination including the transmission fiber and the PMD compensator has a first-order polarization mode dispersion PMD1, the arrival time of the signal will vary. This variation is proportional to the maximum group delay time difference that occurs and thus to the first-order polarization mode dispersion PMD1. Since the clock recovery of the receiver follows these changes in the arrival time, the signal at the input of the voltage-controlled oscillator (VCO) can be fed to an integrator and the output signal thereof can be utilized in order to determine the first-order polarization mode dispersion PMD1. The frequencies at which the polarization scrambler is driven must not be too high, in order that the clock recovery of the receiver can still follow the changes in the arrival time. The fluctuations in the arrival time, the frequency of which lies in the range of the frequencies used for the polarization scrambler, are evaluated in a targeted manner for the measurement of the polarization mode dispersion PMD.

In contrast to the present invention, this method requires a polarization scrambler at the input of the transmission path. In addition, the method no longer functions if the propagation time differences to be measured approach or even exceed the bit duration, since then the clock recovery no longer functions.

EP 0 798 883 A2 discloses an optical receiver with an equalizer circuit for disturbances caused by polarization mode dispersion PMD. The optical receiver of the incoming signal has a splitting device for separating the TE and TM modes of the incoming signal with a polarization controller, which splits the signal fed to it into two electrical signal components corresponding to the TE and TM modes. The two signal components have a propagation time difference which is caused, e.g., by polarization mode dispersion PMD and corresponds to an impairment of the signal quality. Via multistage decision units and a regulating device, the equalizer circuit supplies a quality measurement of the two signal components, e.g., by determining their bit error rate or with the aid of a minimization method for the high-frequency components contained in the electrical signal components. After the selection of the best signal component, the equalizer circuit outputs a data signal with a minimal bit error rate. Delay devices will compensate for the time difference between the two signal components continuously or in a stepwise manner through control signals of the regulating device. Indications about the measurement of the time delay or the control signals for compensating for the time difference are not given here. In the optical part of the optical receiver, only the polarization planes of the incoming optical signal are influenced a regulating signal proceeding from the regulating device, depending on the quality measurement carried out. A measurement of the time delay over a bit duration likewise cannot be carried out.

"Polarization Mode Dispersion Compensation by Phase Diversity Detection", B. W. Hakki, IEEE Photonics Technology Letters, Vol. 9, No. 1, January 1997, describes a PMD compensator in which an optical signal having polarization mode dispersion is split into the two principal states of polarization PSP by maximizing the measured phase difference between two pseudo-random data signals with a data rate of 10 Gbit/s. After the determination of the phase difference via a 5 GHz Gilbert mixer, a delay line is adjusted for minimizing the phase difference. A measurement or a compensation of the phase difference, caused by polarization mode dispersion, between the data signals corresponding to the principal states of polarization PSP is also limited to the bit duration in this case.

Various PMD compensators are known just for compensating for the polarization mode dispersion PMD.

WO 00/41344 discloses a PMD compensator which automatically finds two principal states of polarization PSP and directs them, after digital signal processing, onto two orthogonal linear directions of polarization of a beam splitter.

WO 00/45531 discloses another PMD compensator, which compensates the phase of each bit of the two data signals, which are time-offset through polarization mode dispersion, without digital signal processing but via a clock recovery and a phase modulator.

WO 00/03505 furthermore discloses a PMD compensator which has a birefringent substrate and a waveguide, formed on the surface, with electrically conductive electrodes, and in which many different polarization transformations can be set via control voltages at the electrodes during operation in such a way that the polarization mode dispersion PMD of first and higher orders can be compensated for. FIG. 5 of this document describes an adaptive PMD compensator in which a regulation one or, depending on small or large values of the polarization mode dispersion, a number of passband filterings of the signal proceeding from the PMD compensator effects a resetting of the control voltages of the PMD compensator, the resetting being controlled by a regulator.

The object of the present invention, then, is to specify a system and a method for measuring and compensating for the distortions due to polarization mode dispersion of first order and moreover higher orders during the transmission of an optical signal which enable large propagation time differences, such as above a bit duration, to be determined.

SUMMARY OF THE INVENTION

In a first step, a system for measuring the first-order polarization mode dispersion of an optical signal is described, in which the optical signal is fed to a polarization controller, which outputs two orthogonally polarized signals, which have a propagation time difference between one another and are in each case fed a polarization beam splitter into two optical branches each having an optical receiver for conversion into electrical output signals. According to the present invention, a regulator is connected downstream of the two optical receivers and has an accurate evaluation unit for the propagation time difference via the cross-correlation between the electrical output signals. Furthermore, an adjustable delay element is arranged upstream of one of the optical receivers in one of the branches, its delay being adjustable via a regulating signal from the regulator for searching for the cross-correlation maximum. The search is advantageously effected over a large measurement range which can lie above a bit duration. Two variants of the present invention's system for measuring the first-order polarization mode dispersion are described here.

Further configurations of systems according to the present invention enable a measurement and an additional compensation of the first-order polarization mode dispersion by determining the measured propagation time difference.

A measurement and a compensation of the first-order polarization mode dispersion are primarily described in the case of the present invention. Further systems according to the present invention are also described, which likewise determine and compensate for further higher orders of the polarization mode dispersion. Severe distortions due to high orders of the polarization mode dispersion are thereby suppressed in an advantageous manner, in particular in the case of large propagation time differences.

A method according to the present invention for determining or compensating for the propagation time difference between two orthogonally polarized signals in the case of first-order polarization mode dispersion is described as well.

Additional features and advantages of the present invention are described in, and will be apparent from, the following Detailed Description of the Invention and the Figures.

BRIEF DESCRIPTION OF THE FIGURES

FIG. 3 shows a second system according to the present invention for measuring the propagation time difference in the case of first-order polarization mode dispersion.

FIG. 4 shows a first system according to the present invention for measuring and compensating for the propagation time difference DT in the case of first-order polarization mode dispersion.

DETAILED DESCRIPTION OF THE INVENTION

Figure 1:
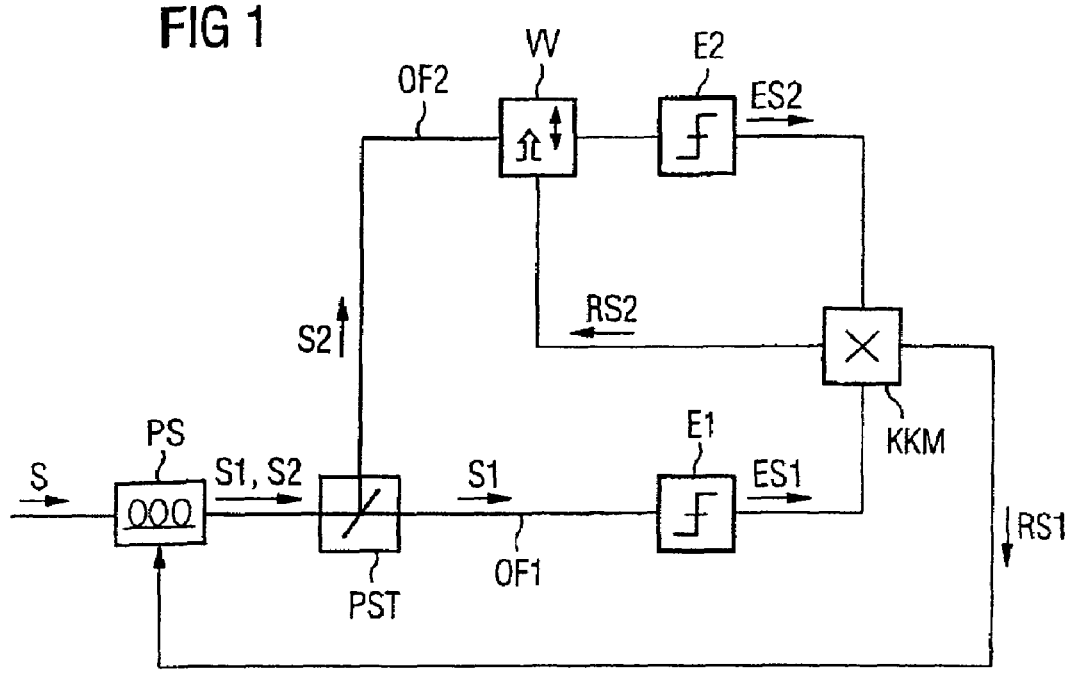
FIG. 1 shows a first system according to the present invention for measuring the propagation time difference in the case of first-order polarization mode dispersion.

FIG. 1 shows a first system according to the present invention for measuring the propagation time difference DT in the case of a first-order polarization mode dispersion PMD1, an optical signal S having first-order polarization mode dispersion PMD1 being fed in at the input of the system. Connected downstream of the input of the system is a polarization controller PS for the adjustable separation and mapping of the optical signal S into two orthogonally polarized signals S1, S2 onto the principal axes of a polarization beam splitter PST connected downstream. The term "orthogonally polarized" in this case means that all the polarized states of a signal can be described via two orthogonally polarized signals. The directions of polarization, e.g. linearly polarized, of the signals S1, S2 are set at the output of the polarization controller PS in such a way that the signals S1, S2 exactly meet the principal axes of the polarization beam splitter PST and are each conducted into a further optical branch OF1, OF2. Connected to the two optical branches OF1, OF2 are two optoelectronic transducers E1, E2, e.g. as optical receivers such as photodiodes, whose two electrical output signals ES1, ES2 are fed to a regulator KKM. Two regulating signals RS1, RS2 of the regulator KKM are fed to the polarization controller PS and to an adjustable delay element VV, respectively. The adjustable delay element VV is arranged between the polarization beam splitter PST and one of the optoelectronic transducers E1 or E2. The optoelectronic transducers E1, E2 have a clock recovery and a decision stage.

The regulator KKM has an evaluation unit for the propagation time difference DT between the signals S1 and S2 by determining the cross-correlation between the electrical output signals ES1, ES2, in which case, during operation, the electrical signal ES2 has a delay with respect to the signal S2, which delay is set by the delay element VV and is furthermore finely determined permanently as residual delay or is finely compensated for in further systems of the present invention.

Firstly, the delay of the delay element VV is varied via the regulating signal RS2 until the cross-correlation maximum is reached, and the polarization controller PS is then regulated for magnitude-related maximization of the set delay of the delay element VV via the regulating signal RS1 from the regulator KKM. As such, the delay of the delay element VV is adjusted in such a way that it corresponds to the original propagation time difference DT between the optical signals S1, S2. Once the maximum of the set delay of the delay element VV has been reached by the adjustment of the polarization controller PS, the polarization controller PS maps the principal states of polarization PSP with a maximum propagation time difference DT precisely onto the separation characteristic curves or so-called principal axis of the polarization beam splitter PST. The delay VV set in this case thus corresponds precisely to the measured propagation time difference DT caused by first-order polarization mode dispersion PMD1.

Figure 2:
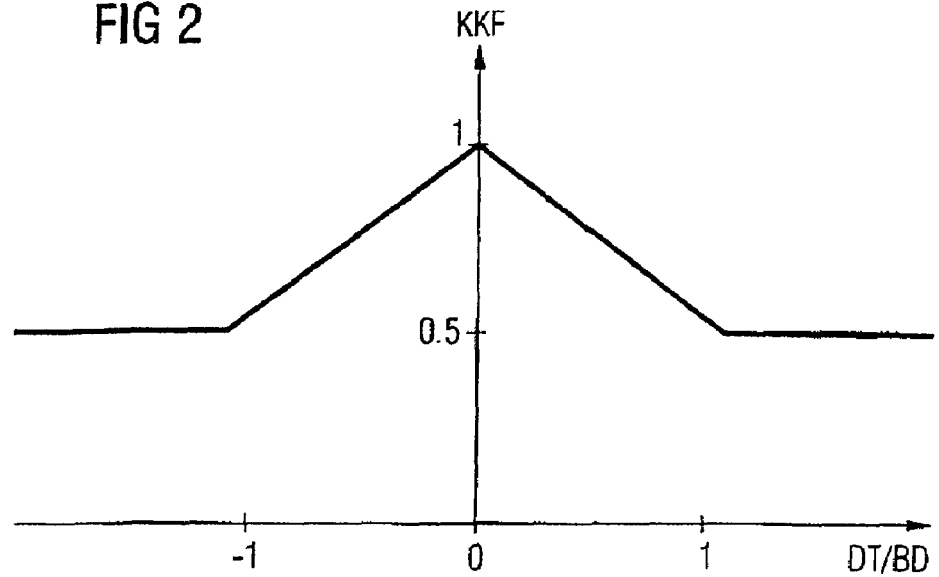
FIG. 2 shows an illustration of the cross-correlation as a function of the propagation time difference DT between two offset signals within and above a bit duration BD.

FIG. 2 illustrates the normalized cross-correlation, provided as evaluation unit for the propagation time difference in the regulator KKM from FIG. 1, as a function of the propagation time difference DT or a temporal delay adjustment between two offset signals below and above a bit duration BD.

If the output signals ES1, ES2 in the case of the system in accordance with FIG. 1 have no propagation time difference, then the cross-correlation maximum is reached here with the value 1. For propagation time differences DT up to a bit duration BD, the cross-correlation function decreases proportionally to the propagation time difference DT to a value (here 0.5) (assuming that zeros and ones occur equally often in the output signals ES1 and ES2).

In the case of high propagation time differences, e.g. above the bit duration of the measured signals, the electrical output signals ES1 and ES2 are only minimally correlated. Therefore, the cross-correlation function in the regulator KKM does not supply a maximum, but rather a constant value. In practice, a so-called "magnitude-related" maximization of the set delay of the delay element VV is effected by an optimum mapping or regulation of the orthogonally polarized signals S1, S2 of the polarization controller PS on the principal axes of the polarization beam splitter PST, which is connected downstream. The adjustable delay element VV in one of the optical branches OF1, OF2 is furthermore adjusted until the final search for the maximum value 1 of the cross-correlation is situated in the region of a bit duration BD. Since, over the course of time, the principal states of polarization PSP and the propagation time differences in the case of first-order polarization mode dispersion PMD1, in a transmission fiber, can change or fluctuate e.g. in the case of mechanical disturbances or changes in temperature, the polarization controller PS and the delay element VV are regulated permanently and as quickly enough as possible in order to obtain the cross-correlation maximum.

The delay element VV is calibrated in such a way that, in the central position, the optical signal S1 from the polarization beam splitter PST through to the receiver E1 propagates equally as long as the optical signal S2 from the polarization beam splitter PST through to the receiver E2. In order to determine the propagation time difference DT of the signals S1, S2 in orthogonal states of polarization, the regulator KKM regulates the setting of the delay element VV until a cross-correlation with the value 1 occurs. The requisite detuning of the delay element VV from the central position then specifies for it the value for the propagation time difference DT. Consequently, the measurement range for propagation time differences is limited only by the tuning range of the adjustable delay element VV.

Since the principal states of polarization PSP and the propagation time difference DT, or so-called "differential group delay" DGD, of the transmission fiber can change over the course of time, readjustment must permanently be effected. For this purpose, the set delay of the delay element VV must continuously be varied somewhat, so that there is permanent movement back and forth over the maximum of the cross-correlation function.

If the propagation time difference DT of the transmission path then increases, by way of example, a corresponding evaluation electronic unit can be used to ascertain that the maximum of the cross-correlation function no longer lies in the center of the variation range of the delay of the adjustable delay element VV, and that the delay must be increased in order that the variation is again effected symmetrically with respect to the maximum of the cross-correlation function. If the variation is carried out with a sinusoidal signal, for example, then, with correct setting of the delay, the frequency can no longer be detected in the cross-correlation function (frequency doubling takes place). If the delay is not set correctly and the present operating point lies on one of the edges of the cross-correlation function, then the signal can be detected again and the phase angle specifies that side of the maximum where one is. Such regulating methods, e.g., so-called lock-in methods, are also customary in other areas of technology and can be used here, too, for the stabilization at the maximum as soon as the delay of the adjustable delay element VV has reduced the original propagation time difference DT to a value of less than a bit duration BD.

If the principal states of polarization PSP of the transmission path change, then the algorithm described in the preceding section will lead to a magnitude-reduced setting of the delay, even if the propagation time difference DT of the transmission path has not altered at all. Thus, a further algorithm must permanently make small alterations to the setting of the polarization controller PS, to be precise with the aim of maximizing the setting of the delay of the delay element VV.

If the power distribution of the light between the two principal states of polarization PSP becomes greatly asymmetrical and, in the extreme case, the power is transmitted completely in one of the principal states of polarization PSP of the transmission path, then, with correct setting of the polarization controller PS, one of the two receivers E1 and E2 no longer receives an input signal and the cross-correlation can no longer be formed. There is, thus, the risk of the setting of the delay element VV being altered incorrectly. Therefore, in this case, if the input power at the receiver E1 or E2 falls below a specific power threshold, the setting of the delay element VV and of the polarization controller PS must be retained, to be precise until there is sufficient power again at both receivers. The phase during which the settings are retained is noncritical in so far as, in this case, the light power is contained only in one of the principal states of polarization PSP and, consequently, no distortions due to first-order polarization mode dispersion are present.

If the settings of the delay element VV and of the polarization controller PS are still far removed from the correct operating point after switch-on, the point must first be sought. To that end, the adjustable delay element VV must be tuned over the entire setting range, if appropriate repeatedly with different settings of the polarization controller PS. It is only when the polarization controller PS performs, at least roughly, the correct splitting of the principal states of polarization PSP between the two optical branches that the propagation time difference DT at which the cross-correlation maximum occurs can also be found during the tuning of the delay element VV. If this point has been found, the changes in the principal states of polarization PSP and in the propagation time difference DT of the transmission fiber can be followed continuously according to the method described previously.

FIG. 3 shows a second system according to the present invention for measuring the propagation time difference in the case of first-order polarization mode dispersion PMD1, which is largely identical to the system according to FIG. 1. The difference consists merely in the fact that the adjustable delay element VV from FIG. 1 is replaced by a birefringent element VDV with an adjustable propagation time difference between its principal axes, which is interposed between the polarization controller PS and the polarization beam splitter PST and to which the regulating signal RS2 is fed from the regulator KKM.

This is followed by a polarization beam splitter PST, whose output signals S1, S2 are fed to the receivers E1 and E2. In this case, the polarization beam splitter PST must be coupled to the output of the birefringent element in such a way that it separates the signal components which emerge from the principal axes of the adjustable birefringent element VDV. In comparison with the construction in FIG. 1, the splitting of the signal for the receivers E1 and E2 is thus carried out only after the setting of the propagation time difference.

A coupling-out device EK can be connected downstream of the birefringent element VDV for branching off a signal S3. The signal S3 can be coupled out after regulation via the components (KKM, VDV, PS) by new time-offset, i.e., first-order polarization mode dispersion PMD1 compensated signals S1ko, S2ko and fed to an optical receiver E3. The coupling-out device EK is selected in such a way that it as far as possible does not influence the polarization properties of the transmission between the birefringent element VDV and the polarization beam splitter PST connected downstream. In order to obtain the signal S3, after regulation, a part of the time-shifted signal S2ko could also be coupled out at the output of the birefringent element VDV and be combined again with a coupled-out part of the signal S1ko.

FIG. 4 shows a first system according to the present invention for measuring and compensating for the propagation time difference DT in the case of first-order polarization mode dispersion PMD1. In practice, this system is not embodied in this way owing to the redundancy of its components, but is explained accordingly modularly in FIG. 4 in order to illustrate the circuit principle. The system for measuring the propagation time difference DT first largely corresponds to the system according to FIG. 1 or FIG. 3, the delay element VV or the birefringent element VDV being designated as first delay element VV1 or VDV1, respectively, the polarization controller PS being designated as first polarization controller PS1 and the polarization beam splitter PST being designated as first polarization beam splitter PST1. In contrast to FIGS. 1 and 3, for compensation of the propagation time difference DT, at least a part of the optical signal S, before being fed into the polarization controller PS1, is fed into a second polarization controller PS2 via a coupling-out device AK, a regulating signal RS3 (=RS1) being fed to the second polarization controller from the regulator KKM for the purpose of setting the corresponding principal states of polarization PSP. Connected downstream of the second polarization controller PS2 is a second polarization beam splitter PST2, which separates the principal states of polarization S1k, S2k, having the propagation time difference DT, precisely into two optical branches OF3, OF4. A second adjustable delay element VV2 is arranged in one of the two optical branches in accordance with the measuring system and its delay is set via a regulating signal RS4 (=RS2) from the regulator KKM for compensation of the propagation time difference DT. Afterward, the optical signal S1k and the compensated signal S2ko in the two optical branches OF3, OF4, downstream of the delay element VV2, are combined into an optical signal S3 again via a third polarization beam splitter PST3 and fed to a third receiver E3.

The system described here has been illustrated step by step in order to clarify the measurement and the compensation of first-order polarization node dispersion PMD1. It goes without saying that it is possible, in practice, to obviate some components.

Figure 5:
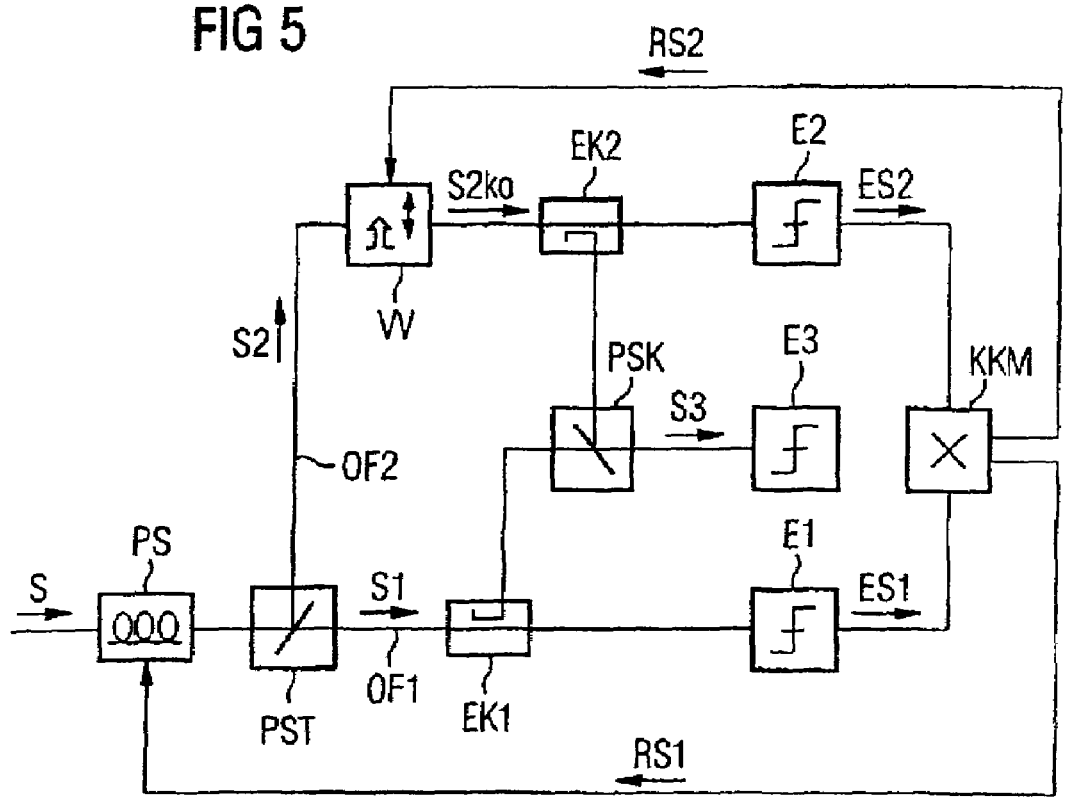
FIG. 5 shows a second system according to the present invention for measuring and compensating for the propagation time difference DT in the case of first-order polarization mode dispersion.

FIG. 5 illustrates a second system according to the present invention for measuring and compensating for the propagation time difference DT in the case of first-order polarization mode dispersion PMD1, in which the system from FIG. 4 is optimized for practical realization purposes. For the measurement of the propagation time difference DT due to first-order polarization mode dispersion PMD1, reference is made to FIG. 1. In the two optical branches OF1, OF2, a respective coupling-out device EK1, EK2 is connected upstream of the receiver E1, E2. A part of the signal S2ko that is PMD1-compensated by the upstream-connected delay element VV that can be set by the regulator KKM is branched away from the coupling-out device EK2 and is combined, via a polarization beam coupler PSK, with a part of the signal S1 that is branched away from the coupling-out device EK1 to form a signal S3. A third receiver E3 may subsequently be arranged at the output of the polarization beam coupler PSK.

This arrangement can likewise be connected downstream with a measuring arrangement according to FIG. 3.

For all the system of the present application, a further variant consists in using an electrical line with a variable delay in the measuring system instead of or in addition to the optically adjustable delay element VV or VDV. The line is inserted after the conversion of the optical signal into an electrical signal via the optoelectronic transducers E1, E2. It is possible to use either one delay line in one receiver or a respective delay line with differential driving in both receivers E1, E2. Furthermore, an optical line with a variable delay is required for the PMD compensation in order that the third receiver E3 receives an undistorted signal S3 containing both principal states of polarization PSP, i.e. here S1, S2ko.

Figure 6:
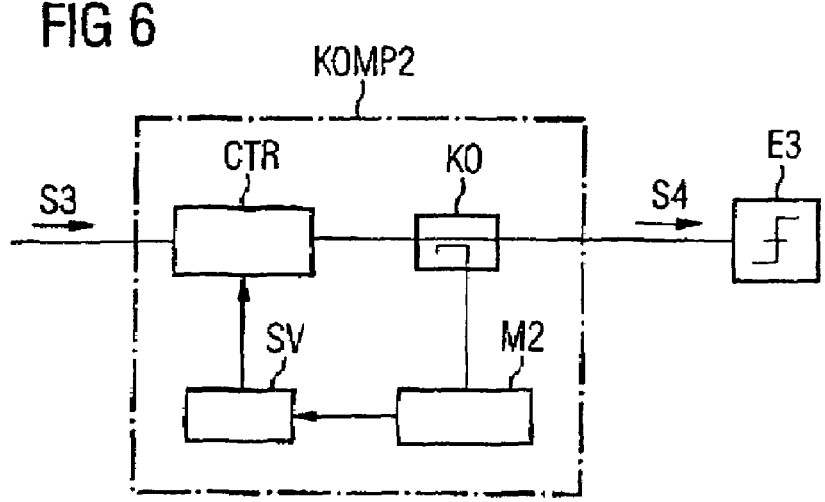
FIG. 6 shows a first extended system according to the present invention for measuring and compensating for the propagation time difference DT in the case of polarization mode dispersion of first and higher orders.

The extended system according to the present invention as illustrated in FIG. 6 enables a measurement and a compensation of the propagation time difference DT in the case of polarization mode dispersion (of first and) of higher orders. Higher orders of the polarization mode dispersion actually have a major influence on the signal quality in the case of large propagation time differences, e.g., above a bit duration, between the principal states of polarization PSP.

Proceeding from FIG. 4 or 5, the signal S3 compensated with first-order polarization mode dispersion PMD1 is fed into a compensator KOMP2 of the polarization mode dispersion of higher orders, the output of which is connected to the optical receiver E3.

In comparison with FIG. 4 or 5 or FIGS. 1, 3, the receivers E1 and E2 will no longer decide correctly owing to corresponding distortions of higher orders. The solution is to use receivers without clock recovery and without decision units; i.e., the cross-correlation in the regulator KKM is calculated from analog signals of photodiodes as optical receivers E1 and E2. The output signals ES1, ES2 are electrically amplified as far as possible to a constant level via an amplifier unit in order that the cross-correlation in the regulator KKM becomes independent of the input powers at the photodiodes E1, E2, in the same way as is also customary for receivers with clock recovery and a decision unit with the aid of an automatic gain control (AGC) amplifier.

Various known compensators can be used as compensator KOMP2 of the polarization mode dispersion of higher orders. The compensator KOMP2 has a multistage PMD controller CTR at the input. The controller may include, for example, a number of birefringent elements, e.g., polarization-maintaining fibers, and polarization controllers which are connected upstream of each of the elements. As an alternative, a component according to the prior art in accordance with WO 00/03505 (already cited) may also be involved, in which the birefringence and the polarization setting possibilities are distributed virtually continuously over the length of the device as PMD controller CTR. A coupler KO connected downstream of the PMD controller CTR carries a part of the light to a measuring device M2, which detects/determines the higher-order polarization mode dispersion or the effect thereof on the signal quality. The output signals of the PMD detector M2 are fed to a signal processing SV, in which a regulating algorithm for minimizing the higher-order polarization mode dispersion detected is implemented. Further output signals of the signal processing SV control the multistage PMD controller CTR, e.g. by resetting the polarization controllers contained therein. The output signal of the higher-order PMD compensator KOMP2 that is not coupled out by the coupler KO is finally fed to the receiver E3. However, this concept presupposes that the properties of the multistage PMD controller CTR are known precisely and, moreover, do not change due to aging effects or these changes are at least known, e.g., through automatic recalibration during operation. Only then can it be ensured that the PMD controller CTR is only driven in such a way that it does not generate first-order polarization mode dispersion PMD1, but rather only higher-order polarization mode dispersion. Otherwise, the previous compensation of first-order polarization mode dispersion PMD1 would be destroyed again.

Figure 7:
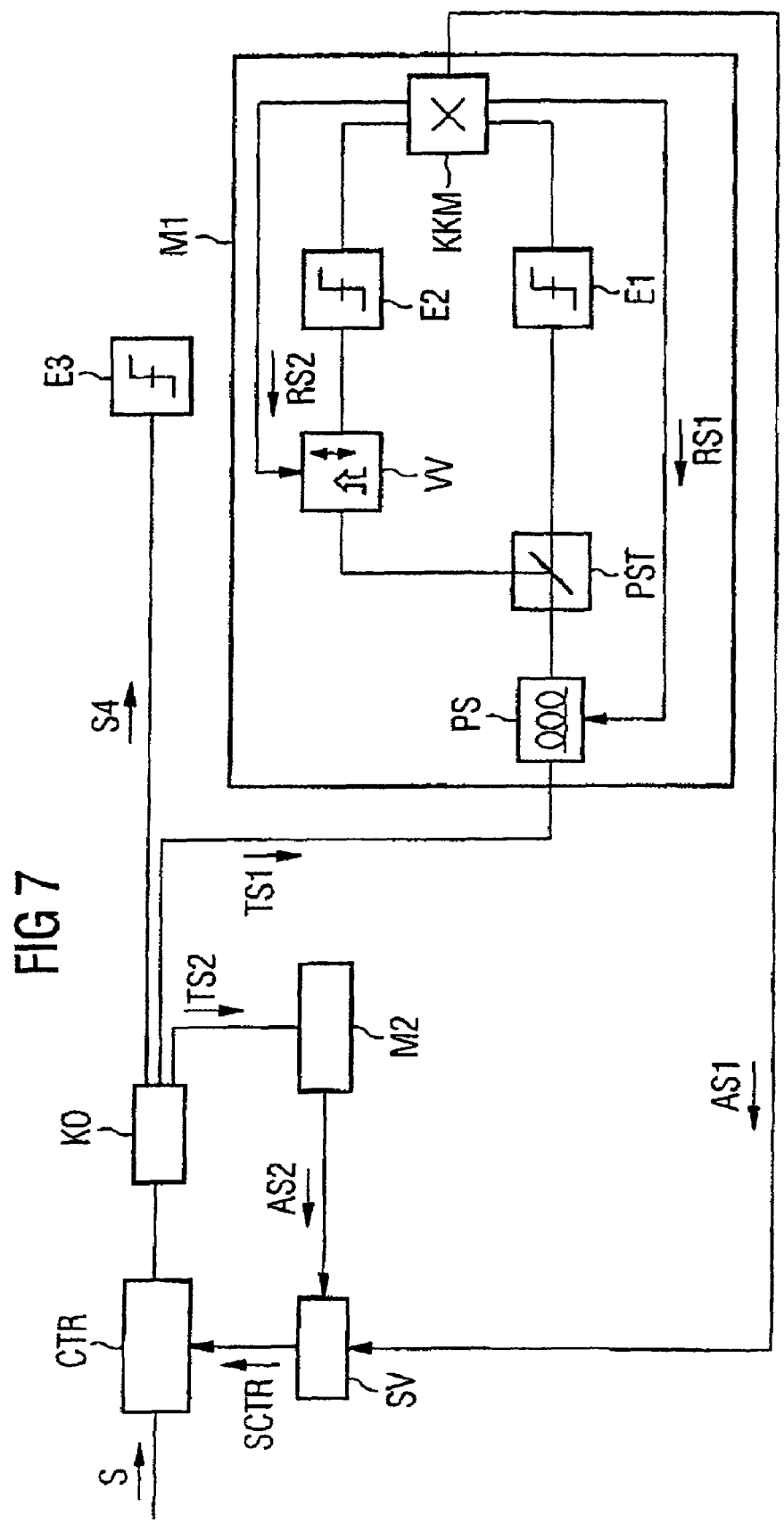
FIG. 7 shows a second extended system according to the present invention for measuring and compensating for the propagation time difference DT in the case of polarization mode dispersion of first and higher orders.

FIG. 7 illustrates a second extended system according to the present invention for measuring and compensating for the propagation time difference DT in the case of polarization mode dispersion of first and higher orders PMD1, PMD2, in which the system for measuring and compensating for the first-order polarization mode dispersion PMD1 is used according to FIGS. 1 to 5. The signal S having polarization mode dispersion passes to a multistage PMD controller CTR, which, on account of the multistage construction, can compensate not only for first-order polarization mode dispersion PMD1 but also for polarization mode dispersion of higher orders PMD2 (see the prior art). With the aid of a coupler KO, a part TS1 of the output signal of the PMD controller CTR is fed to the measuring system M1 illustrated in FIG. 1 for measurement of the first-order polarization mode dispersion PMD1. A further part TS2 of the output signal of the PMD controller CTR is fed to a PMD detector M2 as detection and measuring device for a higher-order polarization mode dispersion PMD2. The output signals AS1, AS2 of the two measuring units M1, M2 are fed to a signal processing SV, which contains a regulating algorithm for minimizing first-and higher-order polarization mode dispersion PMD1, PMD2 and drives the PMD controller CTR correspondingly. Contrary to the system from FIG. 6, here the properties of the multistage PMD controller CTR do not have to be known exactly and exhibit long-term stability. Rather, a permanent minimization of the polarization mode dispersion detected can be effected with the aid of a gradient method. To that end, the alterations for which an improvement was ascertained via the measuring units M1 and M2 are in each case made, e.g., to the input quantities of the control electrodes of the multistage PMD controller CTR.

Although the present invention has been described with reference to specific embodiments, those of skill in the art will recognize that changes may be made thereto without departing from the spirit and scope of the present invention as set forth in the hereafter appended claims.

What is claimed is:

1. A method for determining and compensating for a propagation time difference between first and second orthogonally polarized optical signals, which proceed from a polarization controller to a polarization beam splitter connected downstream, for first-order polarization mode dispersion, the method comprising the steps of:

converting the first and second orthogonally polarized optical signals into first and second electrical signals;

determining a cross-correlation of the first and second electrical signals as a function of one of the propagation time difference and a temporal delay adjustment between one of the first and second optical signals and the first and second electrical signals;

adjusting an adjustable delay element for the first and second optical signals until the cross-correlation function reaches a maximum, the propagation time difference being one of determined and compensated for above a bit duration; and adjusting the polarization controller to maximize a delay set for the delay element.

2. A method for determining and compensating for a propagation time difference between first and second orthogonally polarized optical signals as claimed in claim 1, the method further comprising the step of permanently setting the adjustable delay element, for further determinations and compensations of the polarization mode dispersion, for all resettings of the polarization controller such that the cross-correlation remains at a maximum.

3. A method for determining and compensating for a propagation time difference between first and second orthogonally polarized optical signals as claimed in claim 2, the method further comprising the step of providing a lock-in method for setting the delay element for one of a fine determination and a fine compensation of remaining propagation time differences, at least within a bit duration.

4. A method for determining and compensating for a propagation time difference between first and second orthogonally polarized optical signals as claimed in claim 3, wherein the determination and compensation of the propagation time difference proceeds as rapidly as possible so that changes and fluctuations in the optical signals do not impair the determination and the compensation of the propagation time difference.

5. A method for determining and compensating for a propagation time difference between first and second orthogonally polarized optical signals as claimed in claim 4, wherein the changes and fluctuations in the signals are due to mechanical disturbances.

6. A method for determining and compensating for a propagation time difference between first and second orthogonally polarized optical signals as claimed in claim 4, wherein the changes and fluctuations in the signals are due to changes in temperature over a transmission path connected upstream.

7. A method for determining and compensating for a propagation time difference between first and second orthogonally polarized optical signals as claimed in claim 4, wherein, instead of the optical adjustable delay element, an electrical line with an adjustable delay is one of connected downstream of at least one of the optical receivers and integrated in at least one of the optical receivers.

8. A method for determining and compensating for a propagation time difference between first and second orthogonally polarized optical signals as claimed in claim 4, wherein, in addition to the optical adjustable delay element, an electrical line with an adjustable delay is one of connected downstream of at least one of the optical receivers and integrated into at least one of the optical receivers.

* * * * *